Patented July 21, 1925.

1,546,788

UNITED STATES PATENT OFFICE.

HARRY C. MUNS, OF DECATUR, ILLINOIS.

JOURNAL-BEARING COMPOUND.

No Drawing. Application filed June 23, 1924. Serial No. 721,923.

*To all whom it may concern:*

Be it known that I, HARRY C. MUNS, a citizen of the United States, residing at Decatur, in the county of Macon and State of Illinois, have invented new and useful Improvements in Journal-Bearing Compounds, of which the following is a specification.

The present invention relates to the production of bearings for shafts and the like, the same being composed essentially of the following ingredients:

(a) Hull of Indian corn. This material is the outer smooth shiny scale-like covering of layers of the kernels of the Indian corn, which are readily separated from the inner portions of the kernel, during the milling operation. The same do not have to be ground to a powder, but can be used in the form of flakes, having an area of say, ¼th to ⅛th of a square inch, and these flakes form the basis of the finished composition.

(b) Wood meal from hard wood. This material is preferably free from resinous and gummy constituents, and can be made from various kinds of hard woods such as hickory, oak, maple and the like, ground to the state of a meal or flour. Sawdust can be used to make this. The amount of this material can vary a good deal, and in the case of bearings for shafts to be run at ordinary speed, about 10% to 25% based upon the amount of the corn hulls will be found to be a very good proportion. In the case of very high speed shafts, I preferably omit this ingredient altogether, or greatly reduce its quantity.

(c) A synthetic resin varnish, for instance varnish made from a soluble condensation product of phenol and formaldehyde, although other kinds of varnish having the necessary degree of heat resistance can be used, for instance linseed oil varnish, shellac and alcohol varnish, japan varnish, gummy material extracted from corn oil, or other similar adhesive binder.

It is essential that the character of the binder, amount of binder, amount of corn hulls and the amount of wood meal (if employed) be so adjusted or proportioned as to produce a product having a heat resistance up to at least 250° F., and preferably as high as 350° F. This degree of resistance is readily afforded by synthetic resin varnish or cement, of the kinds above referred to.

For the making of the bearing, I take 100 parts of the Indian corn hulls as above referred to, and may incorporate therewith, say 10 to 25 parts of the hard wood meal free from resinous components, or in the case of shafts which are to be run at high speed, I can omit the wood meal largely or entirely. The above material is then thoroughly mixed with a small amount of the synthetic resinous varnish, and is worked sufficiently to coat all the solid particles, and is then filled into a mold and is pressed, at high pressure, in order to form the molded bearing piece, and the latter is then heated (preferably while in the mold) to a temperature at which the synthetic resin of the varnish will set up or harden sufficiently for the production of a rigid and hard, smooth bearing. The bearings can be in the form of discs, plates, bars or tubes, and are preferably baked by under pressure up to a temperature of, say, 250–300° C., in order to prevent any considerable amount of exudation. The article when so molded is essentially water-resisting and oil-resisting and is also resilient to a certain extent, thereby absorbing the shocks or pounding, due to the use as a bearing, without alteration of size or shape. It is not absorbent of water, oil, gasoline and similar materials. It will be understood that the formed pieces can in many cases be used directly without any machine work thereupon, although the material, after being molded and baked, is capable of being machined if desired.

I claim:

1. A bearing material containing as its essential constituent hull from the Indian corn and a hardened varnish material.

2. A bearing material containing the hull portion of Indian corn, hard wood meal, free from resin, oil or gum, and containing a hardened synthetic resin as a binder.

In testimony whereof I affix my signature.

HARRY C. MUNS.